US005785473A

United States Patent [19]

Stark

[11] Patent Number: 5,785,473
[45] Date of Patent: Jul. 28, 1998

[54] CARGO RESTRAINT SYSTEM

[76] Inventor: Bruce E. Stark, 603 W. Center St., LeRoy, Ill. 61752

[21] Appl. No.: 429,806

[22] Filed: Apr. 27, 1995

[51] Int. Cl.$^6$ ................................................. B60P 7/135
[52] U.S. Cl. ...................... 410/94; 410/95; 410/69
[58] Field of Search ........................ 410/69, 72, 73, 410/76–78, 83, 90, 94, 95, 111, 153; 244/118.1, 137.1; 292/177

[56] References Cited

U.S. PATENT DOCUMENTS

| | | | |
|---|---|---|---|
| 2,757,039 | 7/1956 | Merriman | 410/94 |
| 3,520,433 | 7/1970 | Blackburn | 410/90 X |
| 4,013,017 | 3/1977 | Toyota et al. | 410/83 X |
| 4,203,372 | 5/1980 | Ivanor et al. | 410/67 |
| 4,375,932 | 3/1983 | Alberti | 410/94 X |
| 4,379,535 | 4/1983 | Baldwin et al. | 410/78 X |
| 4,416,579 | 11/1983 | Alberti | 410/94 X |
| 4,630,981 | 12/1986 | Mandrell | 410/91 |
| 4,784,547 | 11/1988 | Prinz et al. | 410/153 X |
| 5,092,250 | 3/1992 | Halliar | 410/77 X |
| 5,265,991 | 11/1993 | Herrick et al. | 410/69 |

*Primary Examiner*—Stephen T. Gordon
*Attorney, Agent, or Firm*—Philip L. Bateman

[57] ABSTRACT

A plurality of vertical rod assemblies restrain the movement of cargo during transport on a floor of a carrier having source of fluid which is at about atmospheric pressure while the carrier is being loaded and which is pressurized after loading, e.g., a trailer having wheels with brakes which are actuated by a pressurized air line. Each vertical rod assembly contains a rod which remains flush with the floor on which the cargo is loaded when the fluid source is not pressurized. When the fluid source is pressurized, each rod rises from openings in the floor at locations adjacent the cargo. Each rod is attached to a piston in a cylinder which moves up and down in response to the application and release of pressure.

8 Claims, 2 Drawing Sheets

5,785,473

1

CARGO RESTRAINT SYSTEM

FIELD OF THE INVENTION

This invention relates to the restraint of cargo on a carrier. More particularly, this invention relates to a cargo restraint system having vertical rods which rise automatically from the floor of the carrier at locations adjacent the cargo.

BACKGROUND OF THE INVENTION

In the U.S.A., over 90 percent of manufactured goods are transported by truck. There are countless types of trucks that carry manufactured goods, but the most common type for long-distance hauling is the tractor trailer. A tractor trailer is composed of two units. The tractor contains the engine, the steering mechanism, the controls, and the cab where the driver sits. The tractor typically has three axles and ten wheels. The trailer is the cargo-carrying unit. A trailer typically has two axles and eight wheels at the back. A kingpin at the front of the trailer engages a hinged plate at the back of the tractor to connect the two units together. This type of trailer having wheels at only the back is commonly called a semi-trailer. The most common type of semi-trailer is a box trailer, also called a van. A box trailer has a floor, four walls, and a roof which fully encloses the cargo area. Another common type of semi-trailer is a flatbed trailer, also called a platform trailer. A flatbed trailer has no walls or roof. Both box trailers and flatbed trailers are typically about 50 feet long and 8½ feet wide and can carry loads of cargo weighing about 40,000 pounds.

The weight distribution of cargo on a trailer is very important. The weight is preferably distributed equally between the axles and between the left and right wheels of each axle. Cargo loaded on a trailer is prone to shifting, i.e., sliding across the floor, if the trailer is subjected to excessive deceleration during a stop or excessive lateral acceleration during a turn. The movement of cargo in these situations is a function of: (1) the forces imparted by the movement of the tractor trailer; (2) the friction between the cargo and the floor of the trailer; and (3) the downward force exerted by the cargo (its weight per surface area). To prevent cargo from shifting, it is sometimes restrained by ropes, belts, nets, or the like. It has also been taught that floor-mounted protuberances are useful in restraining cargo. Examples of such devices are disclosed in Ivanov et al., U.S. Pat. No. 4,203,372, issued May 20, 1980; Alberti, U.S. Pat. No. 4,375,932, issued Mar. 8, 1983; Alberti, U.S. Pat. No. 4,416,579, issued Nov. 22, 1983; Mandrell, U.S. Pat. No. 4,630,981, issued Dec. 23, 1986; and Herrick et al., U.S. Pat. No. 5,265,991, issued Nov. 30, 1993. These devices are moved between retracted and extended positions by the person loading the cargo. These devices also require the cargo to be loaded and positioned in particular configurations to be restrained.

Unfortunately, restraining cargo with such floor-mounted devices or with ropes, belts, etc. is a time-consuming and/or expensive operation. Accordingly, it remains common for heavy loads of cargo in box trailers to not be restrained in any manner. The cargo stays in position in the majority of trips. But occasionally the cargo shifts during transport. In some cases, the shifting can actually cause the trailer to tip over onto its side. The result is danger to the truck driver and other drivers nearby, damage to the tractor trailer, damage to the cargo, and the cost and time delay in unloading the trailer, placing it upright, and then reloading it.

It would be very desirable if a cargo restraint system were available which was effective at preventing the shifting of cargo during transport and yet was inexpensive, fully automatic, and would not require the cargo to be loaded in any particular configuration.

SUMMARY OF THE INVENTION

The general object of this invention is to provide an improved system for restraining cargo. A more particular object is to provide such a system which requires no external source of power to operate and which is fully automatic.

I have invented an improved system for restraining the movement of cargo during transport on a floor of a carrier having a source of fluid which is at about atmospheric pressure while the carrier is being loaded and which is pressurized after loading. The system comprises a plurality of vertical rods which are adapted to remain flush with or below the topside of the floor when the fluid source is not pressurized and which are adapted to rise from openings in the floor adjacent the cargo when the fluid source is pressurized. Each rod forms part of an assembly comprising:

(a) a vertical cylinder which encloses a portion of the length of the rod and which has a top opening through which a portion of the length of the rod extends, the cylinder being adapted to mount on the underside of the carrier floor centered under an opening in the floor;

(b) a piston which is attached to the rod and which has the same axis as the rod, the piston being adapted to move up and down in the cylinder with a sufficiently close fit that a seal between the piston and the cylinder is maintained; and (c) a port in the cylinder below the piston adapted to connect to, and communicate with, the fluid source; such that, when the cylinder is mounted on the underside of the carrier floor, the port is connected to the fluid source, and the fluid source is pressurized, a net upward force is created on the piston which causes the piston to move upward in the cylinder and thereby causes the rod to rise above the floor provided there is no cargo on the floor at the location exerting a downward force sufficient to overcome the upward force on the rod.

The cargo restraint system of this invention is operated by the source of pressurized fluid. Most tractor trailers contain a source of pressurized air for the braking system and many also contain a source of pressurized hydraulic fluid. Therefore, no external source of physical, mechanical, or electrical power is required. The system operates fully automatically which provides several important benefits. First, the system is always functioning when needed—there is no danger of a person forgetting to restrain the cargo. Second, the system requires no time or labor to actuate. Third, the system restrains the cargo wherever the cargo is originally loaded—there are no specific configurations, tracks, or guides on which the cargo must be loaded.

DETAILED DESCRIPTION OF THE INVENTION

Figure 1:
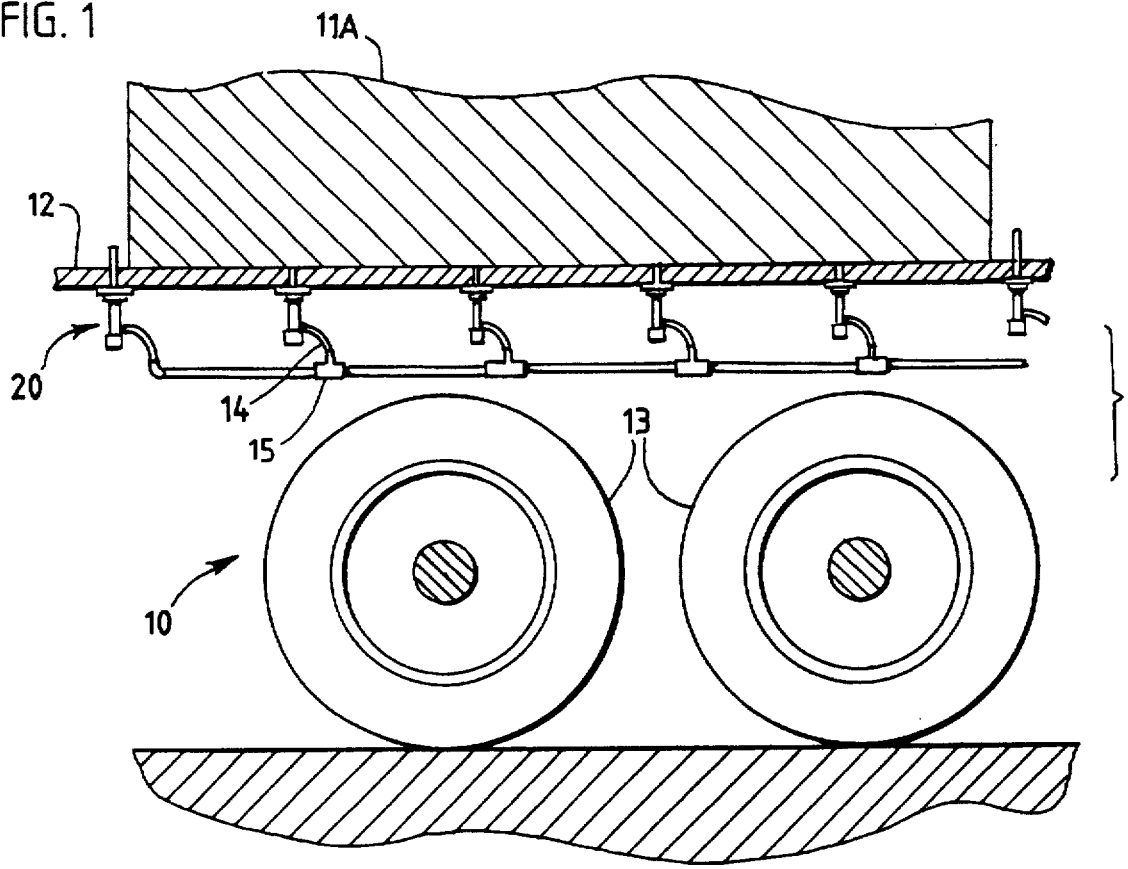
FIG. 1 is a schematic view of the cargo restraint system of the invention showing two of the vertical rod assemblies.

This invention is best understood by reference to the drawings. In FIG. 1, the rear portion of a semi-trailer 10 is shown. A box of cargo 11A sits on the floor (or bed) 12 of the trailer. The floor is typically made of wood and has a thickness of about two inches. A number of reinforcing steel members (not shown) run across the width of the underside of the floor.

Wheels 13 contain disc or drum brakes that are actuated by pressurized air. The brakes engage when air pressure is released and disengage when air pressure is applied to ensure that the tractor trailer does not lose its ability to stop if a leak or other malfunction develops in the pressurized air system. The air system includes an air compressor which is powered by the tractor's engine. The air pressure generated is typically about 80 to 150 psig. The pressurized air flows from the compressor to tanks and then to the brake pedal unit. From the brake pedal, the pressurized air flows through regulators and then to an individual brake chamber for each wheel. In FIG. 1, a portion of air hose 14 running from the brake pedal to the wheels is shown.

The cargo restraint system of this invention comprises a plurality of vertical rod assemblies 20, two of which are shown in FIG. 1. Each assembly communicates with the air brake system via hose 14 and T-connector 15. Alternatively, each assembly communicates with another source of pressurized fluid, such as the hydraulic fluid system used to raise the cab in a cab-over-engine tractor. The rods restrain the cargo by automatically rising from the floor adjacent, and surrounding, the cargo when the fluid system is pressurized. As will be seen, the rods do not rise if cargo is on top of them. For example, in FIG. 1 the rod located in front of the cargo has risen and is in its extended position restraining the cargo whereas the rod located below the cargo is in its retracted position flush with the floor. If the cargo begins to shift, it will contact one or more rods and be restrained. The extended rod shown in FIG. 1 restrains the cargo from forward movement of more than a few inches.

The vertical rod assemblies are spaced apart on the floor. The number and location of the assemblies are matters of choice. As the number of assemblies increases, the spacing between them decreases and the distance between the cargo and adjacent rods decreases (assuming a uniform spacing of the assemblies). It is desirable that the distance between the cargo and the adjacent rods be less than a few feet so that the movement of the cargo is minimal. Furthermore, the force needed to restrain a stationary cargo subjected to acceleration is considerably less than the force needed to restrain the cargo if it has already begun to move because of the effect of momentum. Accordingly, other things being equal, the strength needed for the vertical rod assemblies decreases as their number increases. On the other hand, the cost of installing the vertical rod assemblies increases as their number increases. In addition, as the number of assemblies increases, the chances of leaks or other malfunctions in the fluid system increases.

Figure 2:
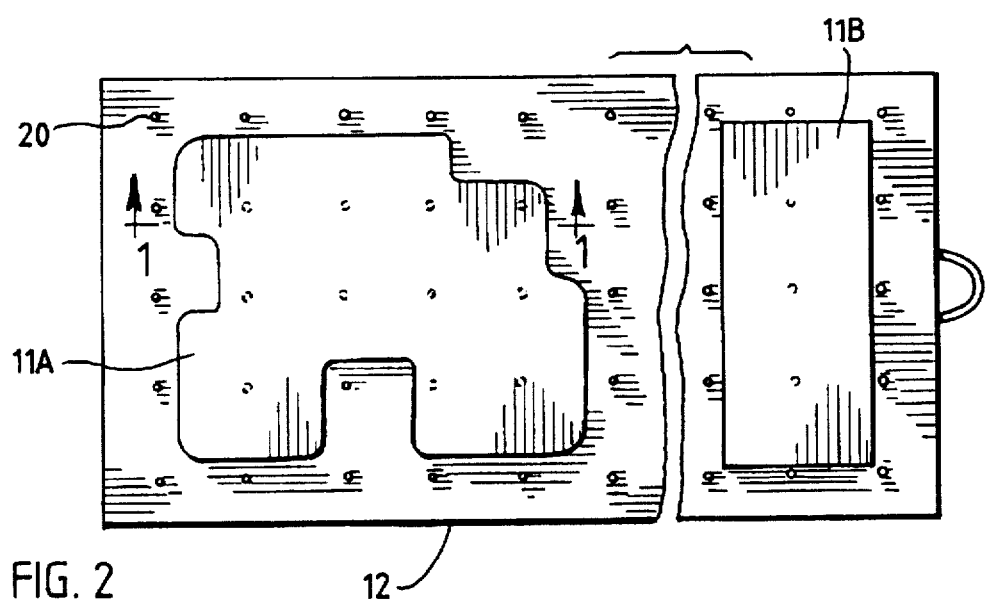
FIG. 2 is a top view of the floor of a semi-trailer showing the location of the vertical rod assemblies.

FIG. 2 shows a representative distribution of 60 vertical rod assemblies in the floor of a box semi-trailer. The assemblies are arranged in 12 rows of five (three of the rows are not seen because of the break in the drawing). This type of uniform distribution throughout the entire floor surface is preferred for general use with varying types, sizes, and configurations of loads. It can be seen that both an irregular-shaped load 11A at the rear of the trailer and a regular-shaped load 11B at the front of the trailer are effectively restrained with this distribution. If a particular type of load is frequently carried, the location of the rod assemblies can, of course, be chosen to more closely surround the cargo. In general, the number of vertical rod assemblies in a standard-size trailer is about 8 to 80, preferably about 10 to 60, and most preferably about 20 to 40. Regardless of the number and location of the assemblies, when the air brake system (or other fluid system) is pressurized, vertical rods will rise at locations where no cargo is present and thereby restrain the cargo regardless of its location.

Figure 3:
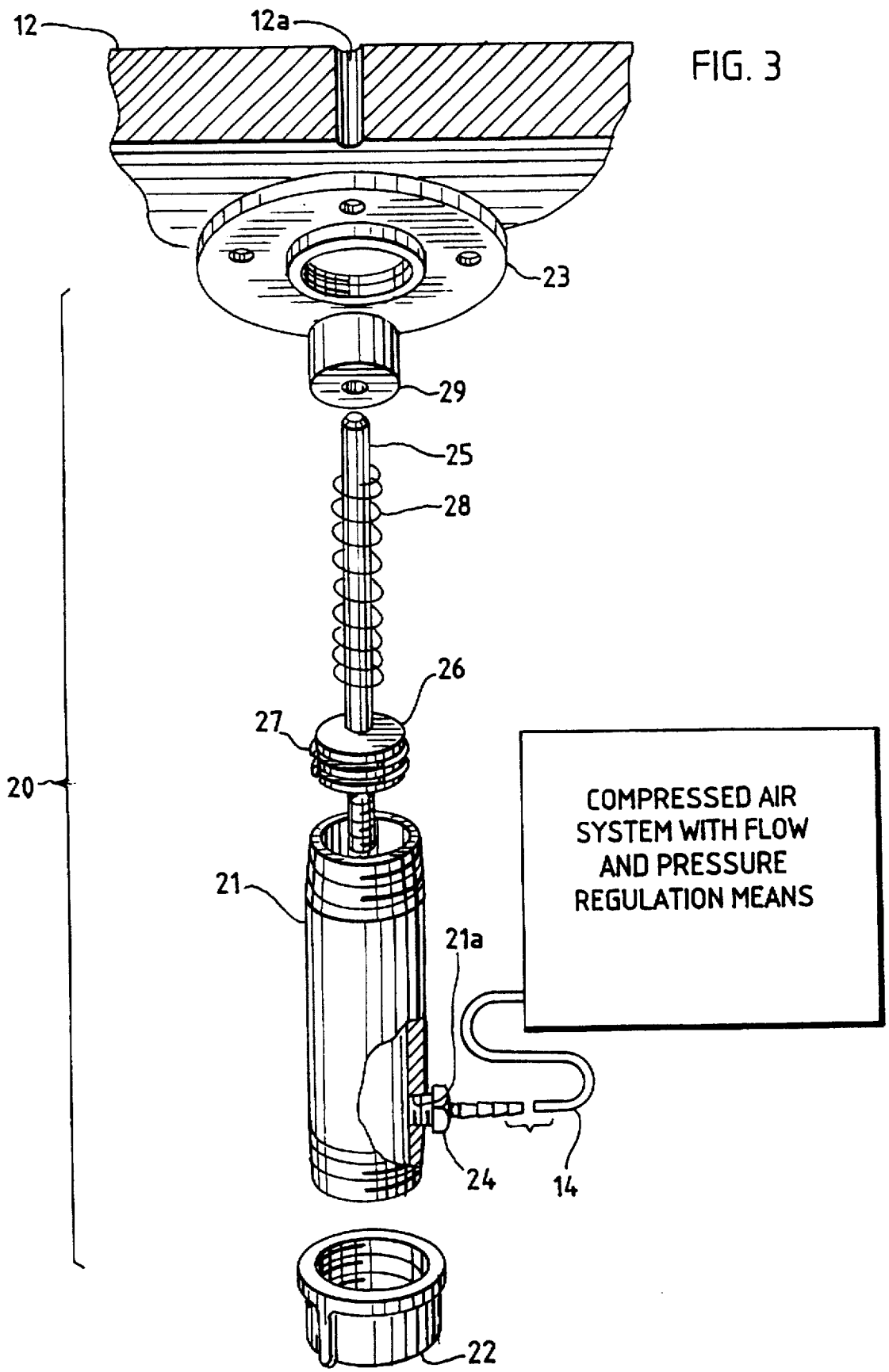
FIG. 3 is a perspective, exploded view of a vertical rod assembly.

Turning to FIG. 3, an individual vertical rod assembly is shown exploded for clarity. A six-inch section of galvanized steel tubing 21 having an inside diameter of about 1½ inches is threaded into an end cap 22 at one end and into a flange 23 at the other end to form a vertical cylinder having an open top. The length and diameter of the cylinder are dependent upon the dimensions of the rod and piston, as explained below. One limitation is that the cylinder is not so long as to scrape the ground. Suitable cylinders are also formed with materials other than steel tubing. For example, steel pipe or molded plastic or fiberglass are suitable. In any event, a port 24 is threaded into a hole 21a near the bottom of the cylinder. As explained in detail below, pressurized fluid enters the cylinder via the port.

A steel rod 25 having a length of about 8 inches and an outside diameter of about ⅝ inches is rounded, or blunt, at the top. The length of the rod is about the length of the cylinder plus the thickness of the floor so that the top of the rod is flush with the top of the floor when it rests at the bottom of the cylinder. As the cylinder and rod length increases, the length of the rod rising above the floor in the extended position increases as well. In the embodiment shown in FIG. 1, the rod rises about 3 inches above the floor when extended. A 3-inch rise is suitable for many purposes, but there are situations where a shorter or longer rise may be desirable. For example, a one-inch rise is adequate to restrain pallets, but a rod with a 6 to 24-inch rise is preferred to restrain large, tall, relatively lightweight boxes because such boxes might easily tip over a shorter rod.

A piston 26 is attached to the rod so that most of the rod extends above and a portion of the rod extends below. The purpose of the rod extension below the piston is to position the piston above the port. In the embodiment shown in FIG. 1, about ½ to 1 inch of the rod extends below the piston, but the amount of the extension is a matter of choice. By the same token, the embodiment shown in FIG. 1 contains a rod which is formed of a material which is separate from the piston, but the two components can be made of a single piece of material or they can be made of three or more pieces of material. The piston has a diameter slightly less than the inside diameter of the cylinder. In the embodiment shown, the piston has an outside diameter of about 1⁷⁄₁₆ inches, just slightly less than the inside diameter of the cylinder. The piston preferably contains two annular channels into which rubber O-rings 27 sit. The O-rings provide a seal between the piston and the cylinder in the same manner as piston rings in an internal combustion engine. A number of other seal-forming methods are known in the field of pressurized fluids.

A coiled spring 28 surrounds the portion of the rod above the piston. A sleeve 29 fits above the spring on the rod. The sleeve acts as a guide for the rod and also protects the piston from lateral stress. The entire assembly is mounted to the underside of the floor of a semi-trailer with screws (not shown) or other fasteners and directly below a hole 12a drilled through the floor. The diameter of the hole is slightly greater than that of the rod. The combined lengths of the spring and the spacer are such that the spring is compressed slightly when the assembly is mounted. The spring force ensures that the rod is fully retracted when the cylinder is not pressurized.

The operation of the vertical rod assemblies shown in the drawings can now be considered. The semi-trailer is loaded with cargo when disconnected from the tractor. There is no air pressure in the air hoses so each rod is in its fully retracted position, flush with the floor. The cargo is placed in the position desired for weight distribution, unloading order, etc. without regard for the location of the vertical rod assemblies.

After loading, the semi-trailer is connected to the tractor. The air brake lines of the semi-trailer are connected to the tractor's air brake system. When the tractor engine is started, the air brake system is pressurized. The pressurized air travels to each vertical rod assembly and enters the air space in the cylinder below the piston where it exerts an upward force on the piston. If there is no cargo above the assembly, the rod is pushed upward into its fully extended position. But if there is cargo above the assembly, the weight of the cargo plus the force of the spring are sufficient to overcome the upward force and thereby keep the rod in its retracted position. Although not shown in the drawings, it is preferred to include shut-off and bleed valves in the pressurized fluid line running to the rod assemblies so that, if desired, the pressure to the rod assemblies can be released while still maintaining pressure in the rest of the system.

It can be appreciated that an extremely fast upward movement of a rod, even if the rod has a blunt end, has the potential for causing physical injury to anyone standing in the trailer and damage to the cargo. Therefore, it is desirable that the speed of the rod not exceed about 5 feet/sec. The speed of the movement can be reduced, if necessary, by restricting the rate of fluid flow into the cylinder by the use of an orifice or the like.

Similarly, an excessive upward force exerted by the rod will push away any cargo located above the rod, potentially causing damage. Accordingly, it is desirable to limit the upward force. It is preferred that the upward force on the rod be just enough to overcome the effects of friction, gravity, and the spring so that the rod rises only if nothing is placed on top of it. If the fluid pressure is excessive, the force on the rod is preferably reduced by decreasing the pressure with a regulator or the like. Reducing the fluid pressure has the added advantage of increasing the life of the components and reducing the likelihood of leaks.

The cargo restraint system of this invention is particularly suited for use with semi-trailers because a pressurized air system is already present (and, in the case of some semi-trailers, a hydraulic fluid system as well), because the floor is easy to drill through, because the underside of the floor is easily accessible, and because the risk of shifting cargo is especially great. However, the system is also useful in many other types of carriers containing air brakes, hydraulic lines, or other pressurized fluid systems, such as railroad box cars. Although not as desirable, the system can also be used in carriers without a pressurized fluid system, provided one is installed.

I claim:

1. A system for restraining the movement of cargo exerting a gravitational force on a floor of an engine-powered carrier during transport, the system comprising:
   (a) a source of fluid;
   (b) a pressurizer for changing the pressure of the fluid from a first pressure to a second pressure, which second pressure is greater than the first pressure but less than the gravitational force exerted upon the floor by the cargo;
   (c) a means for maintaining the fluid at the first pressure when the carrier engine is off and the cargo is being loaded, and for maintaining the fluid at the second pressure when the engine is on and the carrier is transported; and
   (d) a plurality of vertically-movable rods communicating with the fluid source and distributed throughout the floor, each rod positioned so that it is flush with the topside of the floor when the fluid source is at the first pressure and so that it is risen above the topside of the floor when the fluid source is at the second pressure, provided the rising of the rod is not prevented by the presence of the cargo on top of the rod;

such that, when the system is in place on a carrier and the carrier engine is off, the fluid source is at the first pressure and cargo is loaded without contact with the rods; and such that, when the carrier engine is on and the carrier is transported, the fluid source is at the second pressure and the cargo is restrained by the raised rods adjacent to the cargo.

2. The system of claim 1 wherein the number of vertically-movable rods is about 8 to 80.

3. The system of claim 2 wherein the source of fluid is a hydraulic or air system.

4. The system of claim 3 wherein each vertically-movable rod forms part of an assembly comprising:
   (a) a vertical cylinder which encloses a portion of the length of the rod and which has a top opening through which a portion of the length of the rod extends;
   (b) a piston which is attached to the rod and which has the same vertical axis as the rod, the piston being adapted to move up and down in the cylinder with a sufficiently close fit that a seal between the piston and the cylinder is maintained; and
   (c) a port in the cylinder below the piston connected to, and communicating with, the fluid source.

5. The system of claim 4 wherein the number of vertically-movable rods is about 20 to 40.

6. The system of claim 5 wherein the source of fluid is an air brake system.

7. The system of claim 6 additionally comprising a means for restricting the flow of air to the cylinders.

8. The system of claim 7 additionally comprising a means for regulating the pressure of the air to the cylinders.

* * * * *